US007340630B2

(12) United States Patent
Morris et al.

(10) Patent No.: US 7,340,630 B2
(45) Date of Patent: Mar. 4, 2008

(54) MULTIPROCESSOR SYSTEM WITH INTERACTIVE SYNCHRONIZATION OF LOCAL CLOCKS

(75) Inventors: Dale C. Morris, Steamboat Springs, CO (US); Jonathan K. Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 428 days.

(21) Appl. No.: 10/638,696

(22) Filed: Aug. 8, 2003

(65) Prior Publication Data
US 2005/0033947 A1   Feb. 10, 2005

(51) Int. Cl.
*G06F 1/04*   (2006.01)
*G06F 1/12*   (2006.01)
(52) U.S. Cl. ..................... 713/400; 713/503
(58) Field of Classification Search ............. 713/400, 713/401, 503, 600
See application file for complete search history.

(56) References Cited

U.S. PATENT DOCUMENTS

| | | | | |
|---|---|---|---|---|
| 4,531,185 A * | 7/1985 | Halpern et al. | ............. | 713/375 |
| 5,327,468 A | 7/1994 | Edblad | | |
| 5,408,506 A * | 4/1995 | Mincher et al. | ............. | 375/134 |
| 5,530,846 A * | 6/1996 | Strong | ................. | 713/400 |
| 5,715,438 A * | 2/1998 | Silha | ................. | 713/400 |
| 6,023,769 A | 2/2000 | Gonzalez | | |
| 6,236,623 B1 * | 5/2001 | Read et al. | ................. | 368/46 |
| 6,351,821 B1 * | 2/2002 | Voth | ................. | 713/600 |
| 6,502,141 B1 | 12/2002 | Rawson | | |
| 6,591,370 B1 | 7/2003 | Lovett et al. | | |
| 7,058,838 B2 * | 6/2006 | Xu | ................. | 713/400 |
| 2002/0019951 A1 | 2/2002 | Kubo | | |
| 2002/0031196 A1 * | 3/2002 | Muller et al. | ................. | 375/354 |
| 2002/0129290 A1 * | 9/2002 | Couillard | ................. | 713/400 |
| 2003/0033551 A1 | 2/2003 | Kuhn | | |
| 2003/0103486 A1 * | 6/2003 | Salt et al. | ................. | 370/350 |
| 2005/0210306 A1 * | 9/2005 | Rich et al. | ................. | 713/400 |

OTHER PUBLICATIONS

Mills, David L., "Precision Synchronization of Computer Network Clocks", 1994, pp. 1-16, available from the Internet at http://citeseer.ist.psu.edu/mills94precision.html.
Rangarajan, Sampath, and Satish K. Tripathi, "Efficient Synchronization of Clocks in a Distributed System", Proceedings, Twelfth Real-Time Systems Symposium, IEEE, 1991, pp. 22-31.
Tilak, Raghukul, and Alan D. George, and Robert W. Todd, "Layered Interactive Convergence for Distributed Clock Synchronization", Microprocessors and Microsystems 26 (2002), pp. 407-420.

* cited by examiner

*Primary Examiner*—Dennis M. Butler

(57) ABSTRACT

A multiprocessor computer system comprises multiple data processors, each with an internal clock for providing time stamps to application software. The processors take turns as synchronization masters. The present master transmits a "request" time stamp (indicating the time of transmission according to the local clock) to the other ("slave") processors. Each slave processor responds by returning a "response" time stamp (indicating the time of transmission of the response according to the local slave clock) of its own along with the received request time stamp. The master calculates clock adjustment values from the time of receipt of the responses and the included time stamps. This allows asynchronous clocks to be synchronized so that application time stamps can be validly compared across processors.

10 Claims, 2 Drawing Sheets

MULTIPROCESSOR SYSTEM WITH INTERACTIVE SYNCHRONIZATION OF LOCAL CLOCKS

BACKGROUND OF THE INVENTION

The present invention relates to computer systems and, more particularly, to clock synchronization in multiprocessor systems. A major objective of the invention is to provide an approach to clock synchronization scaleable to multi-processor systems with large numbers of processors.

Some computer applications, e.g., some database applications, time stamp certain operations. In principle, time stamping operations allows a sequence of such operations to be reconstructed, e.g., in the event of a software fault or system crash. However, the time stamps must be sufficiently accurate and precise to allow the sequence to be reconstructed properly.

High-precision time stamps have been provided using local clocks, which are typically free-running counters; the counters are typically driven by fixed-frequency system clock signals so that the counters count at a fixed rate. By locating it "near" a processor, a clock can be quickly accessed by software running on the processor so that access latency does not significantly impair accuracy. If "standard" time (i.e., "wall-clock time") is required, a processor clock can be synchronized with a more remote standard-time clock (also know as a "wall clock") upon initialization and perhaps periodically after that.

This approach works well for single-processor systems, especially where the clock is located within the processor itself. However, in a multi-processor system, some or all of the processors must access a common clock via external data paths, e.g., system buses or interconnect networks. The external data paths not only impose longer latencies, but also impose significant variability in latencies—e.g., as bus or network contentions are resolved.

In a symmetric multiprocessing (SMP) system, an application can have multiple threads running on respective processors. If the different threads are subject to long and variable latencies, the time stamps may not be validly comparable across processors. As a result, operations can be mis-ordered upon reconstruction.

To reduce time-stamp latencies and their variability, each processor can have a local clock. To ensure synchronization of the clocks, they can be driven by a common clock signal. This can provide precise time stamps for simple SMP systems. However, failure of the clock-signal source causes failure of all the counters, which undermines fault tolerance otherwise provided by an SMP system. Also, as the multi-processor system scales, it can be difficult to transmit a single extremely high-frequency clock signal to a large number of components distributed across multi-processor integrated circuits and/or circuit boards.

Another approach is to use multiple counters and multiple clocks. Again each processor can have its own counter, while each counter can have its own clock signal. Alternatively, each clock signal can drive multiple counters-e.g., on the same board. In either case, clocks driven by different clock signals can "drift" relative to each other.

To address this drift, a software routine can quickly compare clock values for different processors and make any necessary correction values. The accuracy of the resulting corrections can be limited as the loads and stores required by the synchronization software are subject to the same unpredictable latencies suffered by all such transactions. If the software is run "on demand" when the main application requires a time stamp, the time stamps will be subject to inaccuracies due to the long and unpredictable latencies involved. Also, application programs designed to access a clock must be changed to call a more time-consuming software routine to obtain the time stamps. If the clock-calibration software is run in the background, it will consume computational power, incurring a significant performance penalty for the main applications. What is needed is a multiprocessor system that provides for accurate time stamps across processors while minimizing any impact on the main-application performance.

SUMMARY OF THE INVENTION

The present invention provides a system for on-going synchronization of asynchronously driven clocks associated with respective processors of a multi-processor system. The processors generate and transmit synchronization messages that include time stamps, e.g., indicating the transmission times for the time stamps. A receiving processor adjusts its clock as a function of the time indicated by the time stamp and an estimated transit duration between transmission and reception of the synchronization message.

Preferably, a "synchronization master" is selected among the processors in a manner that ensures synchronization occurs even if any processor fails. For example, processors can assume master status on a round-robin basis. The master processor can transmit one or more "request" synchronization messages to "synchronization slaves", which are processors not currently selected as synchronization masters.

The request synchronization message includes a "request" time stamp indicating a time according to the master clock (i.e., the clock of the master processor) of transmission for the message. Synchronization slaves receiving the request can respond with respective "response" synchronization messages; these include "response" time stamps indicating transmit times for the responses according to the respective slave clocks (i.e., clocks of slaves processors). The responses also include the respective original request time stamps.

The master processor can then determine clock adjustments from the time (according to its own clock) a response is received and the included time-stamp data. So that clocks do not appear to go backward in time, only forward adjustments are applied. The master processor determines for itself and for each slave clock a respective adjustment required to synchronize it with the most advanced clock represented in the responses. If no slave clock is ahead of the master clock, a "null" adjustment is applied to the master clock. The master transmits the adjustment values to the slave processors, which can then adjust their clocks (e.g., null or forward) accordingly. The method can be iterated with selection of the next master.

In a computer system providing for guaranteed delivery of inter-processor messages, the present invention provides for exempting request time stamps and/or response time stamps from retries to achieve greater accuracy for transit-time determinations. The invention further provides for guaranteed delivery of synchronization time stamps when an inter-processor-message failure rate exceeds some threshold on the principle that less accurate clock adjustments are better than too-infrequent clock adjustments. Preferably, transmissions of adjustment values are subject to guaranteed delivery, since receipt is more critical than timing for these messages.

A major advantage of the invention is that it provides for on-going synchronization of asynchronously-driven processor clocks. Applications with multiple threads running concurrently on different processors can be assured that the time stamps they obtained were actually obtained in the order indicated by the time stamps. Application time stamps are available locally at all times, so there is little latency in obtaining the application time stamps. There is no common-clock signal source that might serve as a single point of system failure. Since the method can be implemented on a hardware level, no software interruptions or redesigns are required. These and other features and advantages are apparent from the description below with reference to the following drawings.

DETAILED DESCRIPTION

Figure 1:
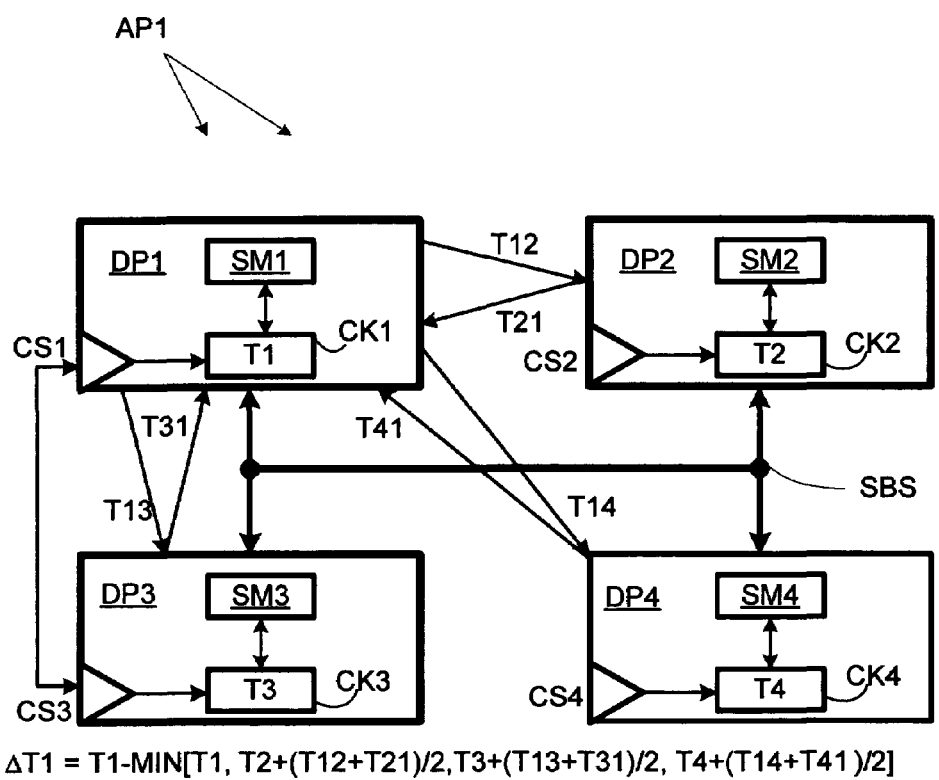
FIG. 1 is a schematic illustration of a multi-processor computer system in accordance with the present invention.

A computer system AP1 comprises multiple data processors DP1-DP4, as shown in FIG. 1. Each processor DP1-DP4 has a respective clock CK1-CK4, which is a counter driven by a respective clock signal CS1-CS4. At each instant, each clock CK1-CK4 indicates a respective time T1-T4. Clock signals CS1 and CS3 have a common source so clocks CK1 and CK3 operate synchronously, but clock signals CS2 and CS4 are generated independently (of each other and of CS1 and CS3), as so synchronization is required. Each processor DP1-DP4 has a respective synchronization manager SM1-SM4 for managing synchronization operations across processors. Processors DP1-DP4 communicate over system bus SBS.

Figure 2:
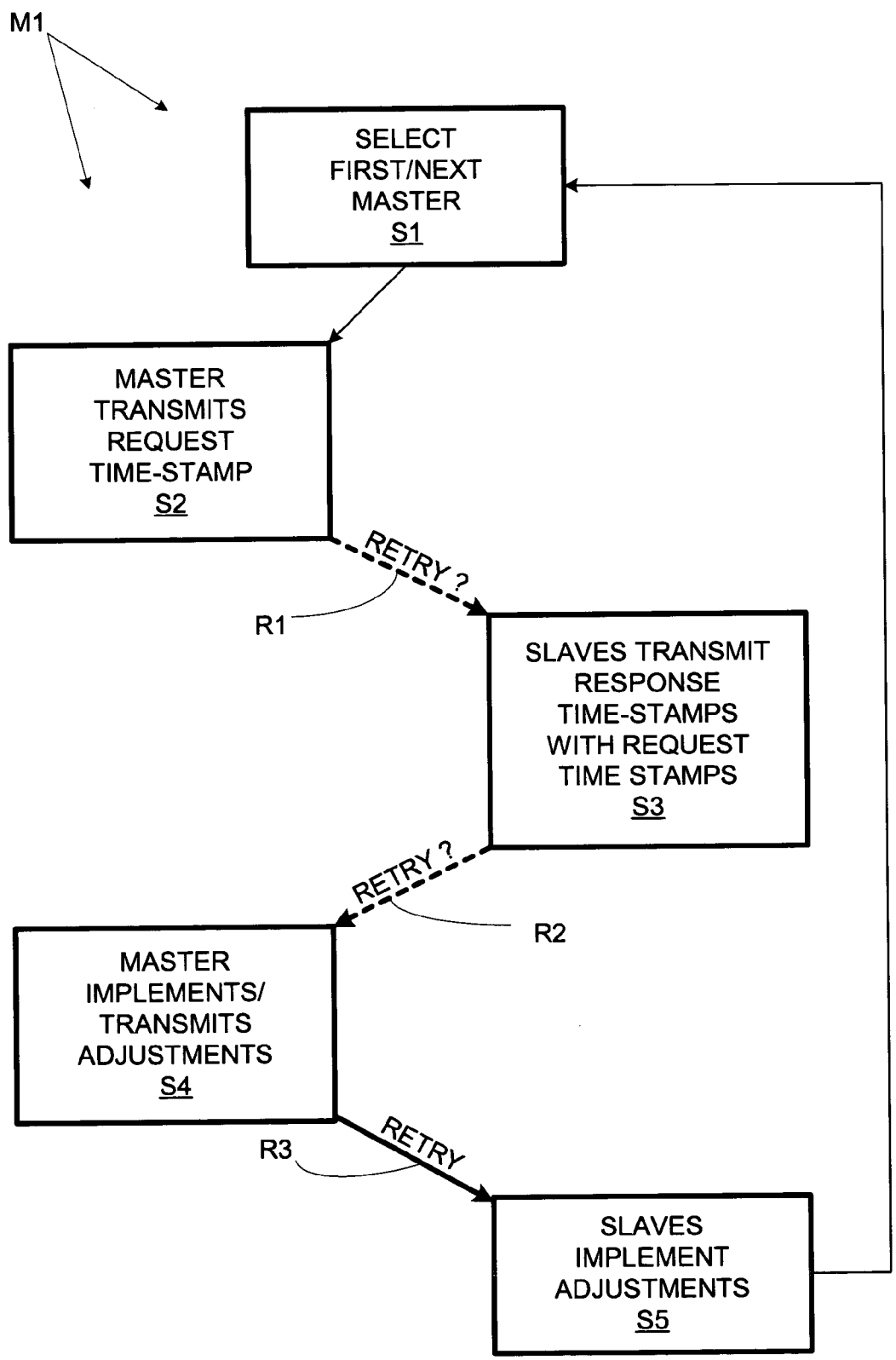
FIG. 2 is a flow chart of a method of the invention practiced in the context of the computer system of FIG. 1.

Synchronization managers SM1-SM4 provide for implementation of a method Ml, flow-charted in FIG. 2, of the invention. At step S1, a first synchronization master is selected from processors DP1-DP4. In the illustrated embodiment, each processor is assigned a schedule for assuming master status. In this case, processor DP1 is the first to be assigned master status. The algorithm for selecting masters is discussed in greater detail after the method has been described in general. At this point, it suffices to indicate that the algorithm minimizes the impact of a failure of one of the processors.

At step S2, master synchronization master SM1 broadcasts a request synchronization message to the current synchronization slave processors, in this case, processors DP2-DP4. The request includes a request time stamp indicating the time of transmission according to the master clock, in this case CK1.

At step S3, slave processors (processors DP2-SP4) transmit response synchronization messages to the master processor. The response includes a "response" time stamp indicating the time the response was transmitted according to the local slave clock. The response also includes the original request time stamp.

At step S4, the master processor (processor DP1) determines clock adjustments from the received responses. An adjustment calculated for the master clock is implemented; adjustment values for the slave processors are transmitted to the respective slave processors. At step S5, slave processors implement the adjustments indicated by received adjustment values.

In step S4, clock adjustments can be preliminarily determined on a pair-wise basis for each received response. The master processor knows the time the request was sent and the time the response was received, both according to the master clock. The difference between these two times is the round-trip transit duration for the request time stamp. The response transit duration can be estimated as half the round-trip transit duration.

The estimated response transit duration can be added to the response time stamp to give an estimate of the time indicated by the respective slave clock at the time the response is received by the master. The estimated slave clock time can be compared with the response receipt time to determine an estimated differential between the master and the respective slave clock.

Adjusting a clock backwards could cause a processor to assign an earlier time stamp to a later event. To avoid this, only forward adjustments are implemented. If the master clock lags the slave clock, the master synchronization master would determine a proposed forward adjustment for the master clock and a null adjustment for the respective slave clock. If the master clock leads the slave clock, the synchronization master would determine a proposed forward adjustment for the respective slave clock and a proposed null adjustment for the master clock.

Generally, there will be more than one response to a time-stamp request so there will be plural proposed adjustment pairs. The master synchronization master determines which clock is the most advanced and synchronizes the other clocks to it. If the master clock is the most advanced, a null adjustment is applied to it and the proposed adjustment values adjustment values are sent to the slaves. If a slave has the leading clock, the master clock is advanced to match it. Adjustment values are calculated for the other slaves and transmitted to them. Preferably, but not necessarily, a null adjustment can be transmitted to the slave with the most advanced clock.

Computer system AP1 provides for guaranteed delivery of messages. A message for which delivery is guaranteed can fail—e.g., where bus SBS or a processor cannot receive an offered message. In such cases, the SBS or transmitting processor retries the message at a later time. Of course, the transit duration for a message that requires retries is much greater than one that does not. If, for example, a request is subject to retries, while a resulting response is not, half the round-trip transit duration will be a poor estimate for the response transit duration. This poor estimate will result in an inaccurate clock adjustment.

To minimize round-trip asymmetries in transit duration, request and response synchronization messages can be exempted from guaranteed delivery and, accordingly, from retries. This means than some requests and responses will not reach their destinations, but those that do will result in relatively accurate adjustments. This approach works when synchronization operations are sufficiently frequent that drift is not excessive despite some missed synchronization operations.

Since delivery of synchronization time-stamp messages is not guaranteed, some slave processors may not receive a synchronization request and some synchronization responses may not reach the master processor. If there is a failure on either the request or response transmission, the respective slave processor is not represented in the adjustment calculations and is not synchronized with other clocks. The synchronization occurs frequently enough that missing one or two synchronizations is not likely to permit excessive time drift. However, missing several synchronization operations may subject the system to excessive drift.

Generally, if the failure rate for synchronization messages is too high, clock drift may be excessive. Under such conditions, the invention provides for waiving the exemption to guaranteed delivery for time-stamp messages. The result is less accurate adjustments, but better overall control of relative drift across clocks.

Since system AP1 provides for both exemption and non-exemption of time-stamp messages from guaranteed delivery, the "Retry" labels at RI (from step S2 to step S3) and at R2 (from step S3 to S4) are accompanied by questions marks in FIG. 2. However, adjustment values messages transmitted from step S4 to step S5, at R3, are not time critical, so the "Retry" label does not sport a question mark.

In system AP1, the decision to exempt or not exempt time stamps is implemented as part of the master-selection algorithm. At step S1, a "master synchronization" processor is selected from the processors of computer system AP1. The selection is according to an algorithm that avoids having a single point of failure for synchronization.

In the illustrated embodiment, masters are chosen in a round-robin fashion. Upon initialization, each processor DP1-DP4 is assigned a schedule for serving as a synchronization master. For example, processor DP1 is scheduled to be master at every 4n+1 seconds, DP2 is scheduled to be master at every 4n+2 seconds, DP3 is scheduled to be master every 4n+3 seconds, and DP4 is scheduled to be master every 4n+0 seconds.

Each processor is also scheduled to substitute as master any multiple of 0.9 seconds before any of its scheduled times if no synchronization request is received during the preceding second. For example, if DP3 receives a synchronization message at second 1 from DP1, but nothing at second 2, then DP3 will broadcast a "stand-in" synchronization request at 2.1 seconds. DP3 will then initiate another synchronization operation as scheduled at 3.0 seconds. If DP4 receives no synchronization requests after 1.0 seconds, it can "stand in" as master at 2.2 seconds and then at 3.1 seconds, before serving as master at 4.0 seconds. When masters are selected as described above, the ensuring requests and responses are exempted from guaranteed delivery.

If 2.5 seconds passes since a processor last served as a master without it receiving a synchronization request, it initiates a synchronization operation. Note that other processors may have served as masters in the interim, but the requests may not have reached the processor in question for a couple of rounds. In any event, this condition represents a failure threshold triggering non-exemption of time stamps from guaranteed delivery. Under these circumstances, guaranteed delivery retries are applied to request and response time-stamps messages.

Excluding synchronization time-stamp messages from retries frees system bus SBS and the processors from the overhead associated with guaranteed delivery. Since retries are not permitted, those time stamps that are received are not subject to the delays associated with retries. This makes transit-time determinations more certain. In addition, non-guaranteed messages can be communicated under circumstances in which guaranteed messages cannot. This, again, makes transit times more determinable. However, where the failure rate is high, synchronization time stamps can be subject to guaranteed delivery retires since imprecise synchronization is better than no synchronization.

The present invention provides for many variations to the illustrated embodiment. In general, the invention provides for systems with much greater numbers of processors. Where the number of processors is very large, it may not be practical for each master to communicate with all other processors. In such systems, the invention provides for grouping processors and providing synchronization within groups and having a separate procedure for synchronizing across groups. Also, the groups can overlap so the intra-group synchronization procedure addresses all processors. For example, each master can have a unique group of slaves assigned to it. In these larger systems, request messages can be multi-cast rather than broadcast.

In addition, the invention provides for groups of processors that have commonly driven clocks. For example, all the processors on a multi-processor integrated circuit can have clocks driven by the same clock signal. However, different clock signals would be used for processors on different integrated circuits. The synchronization approach of the invention could be used to synchronize only one processor from each integrated circuit. The adjustment for a clock on the integrated circuit would then be communicated to the other processors on that integrated circuit for automatic implementation.

The invention provides for a wide variety of algorithms for selecting masters. Round-robin, random, quasi-random, and directed approaches are applicable. In the directed approaches, the current master determines (e.g., from the responses) which processor is to be the next master.

The invention requires that a response-transit duration be estimated or otherwise determined. However, the response transit duration need not be determined from a round-trip duration. For example, the response transit durations can be predetermined, e.g., using a calibration procedure or circuit modeling. The response transit durations may be adjusted according to detected conditions affecting the delivery rate for inter-processor messages. These and other variations upon and modifications to the present invention are provided for by the present invention, the scope of which is defined by the following claims.

What is claimed is:

1. A computer system comprising multiple processors, including
a first processor having a first clock and a first synchronization manager, said first synchronization manager providing for transmitting a request including a request time stamp indicating a time of said transmitting of said request according to said first clock, said first synchronization manager determining respective receipt times for one or more responses each including a copy of said request time stamp and a respective response time stamp, said first synchronization manager adjusting said first clock as a function of said request time, said response times, and said receipt times; and
a second processor having a second clock and a second synchronization manager, said second synchronization manager providing for transmitting one of said responses so that the respective response time stamp indicates a time at which said response is transmitted according to said second clock.

2. A computer system as recited in claim 1 wherein said first synchronization manager provides for, upon receiving said set of response time stamps, transmitting an adjustment value, said second synchronization manager providing for, upon receiving said adjustment value, adjusting said second clock as a function of said adjustment value.

3. A computer system as recited in claim 2 wherein said second synchronization manager provides for transmitting a second request time stamp after adjusting said second clock as a function of said adjustment value, said first synchronization manager providing for transmitting a new response time stamp in response to receiving said second request time stamp.

4. A computer system as recited in claim 2 further comprising communications means providing for retries of at least some interprocessor transmissions including said transmitting of said adjustment value, but excluding from said retries said request time stamps and said response time stamps.

5. A computer system as recited in claim 4 wherein said communications means provides for retries of said request time stamps and said response time stamps only under certain conditions.

6. A method for synchronizing processor clocks in a multiprocessor computer system said method comprising:
- a master processor transmitting a request including a request time stamp, said request time stamp indicating a time of transmission by said master processor,
- one or more slave processors transmitting respective responses, each of said response including a copy of said request time stamp and a respective response time stamp indicating a transmission time for the respective response according to a clock of the respective slave processor,
- said master processor determining receipt times for respective ones of said responses, and
- adjusting a clock of said master processor as a function of said request time stamps, said response time stamps, and said receipt times.

7. A method as recited in claim 6 further comprising:
- said master processor calculating adjustment values for said slave processors and transmitting said adjustment values to said slave processors; and
- said slave processors receiving respective adjustment values and adjusting respective clocks as a function thereof.

8. A method as recited in claim 7 further comprising assigning master processor status to one of said slave processors and repeating the method as defined by claim 7.

9. A method as recited in claim 7 wherein transmissions of said adjustment values are retried upon failure, whereas transmissions of said time stamps are not retried upon failure.

10. A method as recited in claim 7 wherein transmissions of said adjustment values are retried upon failure, whereas transmissions of said time stamps are not retried upon failure unless a failure rate exceeds a predetermined threshold.

* * * * *

UNITED STATES PATENT AND TRADEMARK OFFICE
CERTIFICATE OF CORRECTION

PATENT NO. : 7,340,630 B2 Page 1 of 1
APPLICATION NO. : 10/638696
DATED : March 4, 2008
INVENTOR(S) : Dale C. Morris et al.

It is certified that error appears in the above-identified patent and that said Letters Patent is hereby corrected as shown below:

In column 5, line 9, delete "RI" and insert -- R1 --, therefor.

In column 7, line 20, in Claim 6, delete "response" and insert -- responses --, therefor.

Signed and Sealed this

Eighth Day of July, 2008

JON W. DUDAS
*Director of the United States Patent and Trademark Office*